United States Patent
Manabe

(10) Patent No.: US 8,208,039 B2
(45) Date of Patent: Jun. 26, 2012

(54) IMAGE PROCESSING APPARATUS AND COMPUTER-READABLE MEDIUM

(75) Inventor: Yoshitsugu Manabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 170 days.

(21) Appl. No.: 12/831,403

(22) Filed: Jul. 7, 2010

(65) Prior Publication Data

US 2011/0007188 A1   Jan. 13, 2011

(30) Foreign Application Priority Data

Jul. 8, 2009   (JP) ................................ P2009-161305

(51) Int. Cl.
*H04N 5/235* (2006.01)
*G06K 9/40* (2006.01)

(52) U.S. Cl. ...................... 348/229.1; 382/254; 382/274

(58) Field of Classification Search ............... 348/222.1, 348/229.1, 254, 255; 382/168, 254, 274
See application file for complete search history.

(56) References Cited

U.S. PATENT DOCUMENTS

| | | | |
|---|---|---|---|
| 6,346,994 B1 | 2/2002 | Inoue | |
| 6,664,973 B1 * | 12/2003 | Iwamoto et al. | 345/589 |
| 6,922,209 B1 | 7/2005 | Hwang et al. | |
| 6,965,416 B2 | 11/2005 | Tsuchiya et al. | |
| 7,450,776 B2 * | 11/2008 | Koyama et al. | 382/274 |
| 7,486,836 B2 * | 2/2009 | Kato | 382/274 |
| 7,876,367 B2 * | 1/2011 | Muramatsu | 348/229.1 |
| 2001/0038716 A1 | 11/2001 | Tsuchiya et al. | |
| 2005/0013506 A1 * | 1/2005 | Yano | 382/274 |
| 2006/0007511 A1 * | 1/2006 | Koyama et al. | 358/521 |
| 2006/0023273 A1 * | 2/2006 | Kato | 358/519 |
| 2006/0062562 A1 | 3/2006 | Utagawa | |
| 2006/0115152 A1 | 6/2006 | Tsuchiya | |
| 2007/0292045 A1 * | 12/2007 | Akatsuka | 382/274 |
| 2008/0239118 A1 * | 10/2008 | Muramatsu | 348/251 |
| 2008/0278632 A1 | 11/2008 | Morimoto | |
| 2009/0040338 A1 * | 2/2009 | Muramatsu | 348/229.1 |
| 2010/0020205 A1 | 1/2010 | Ishida et al. | |
| 2010/0053384 A1 | 3/2010 | Manabe | |
| 2010/0061653 A1 * | 3/2010 | Huang et al. | 382/274 |

FOREIGN PATENT DOCUMENTS

EP   2 061 233 A1   5/2009

(Continued)

OTHER PUBLICATIONS

Extended European Search Report dated Sep. 29, 2010 (in English) issued in counterpart European Application No. 10168847.1.

(Continued)

*Primary Examiner* — Kelly L Jerabek
(74) *Attorney, Agent, or Firm* — Holtz, Holtz, Goodman & Chick, PC

(57) ABSTRACT

There is provided an image processing apparatus. The image processing apparatus includes: a brightness information acquisition unit configured to acquire brightness information indicating brightness of each pixel in a target image, wherein high-frequency components are eliminated from the target image; a correction magnification setting unit configured to set, for each pixel of the target image, a correction magnification based on the brightness information, wherein the correction magnification is substantially inversely proportional to the brightness of the pixel; and a gradation correction unit configured to correct the brightness of each pixel based on the correction magnification.

8 Claims, 11 Drawing Sheets

FOREIGN PATENT DOCUMENTS

| | | |
|---|---|---|
| EP | 2 160 020 A2 | 3/2010 |
| JP | 2001-275015 A | 10/2001 |
| JP | 2003-116049 A | 4/2003 |
| JP | 2006-157451 A | 6/2006 |
| JP | 2008-072450 A | 3/2008 |
| JP | 2008-282155 A | 11/2008 |

OTHER PUBLICATIONS

Japanese Office Action dated Apr. 19, 2011 (and English translation thereof) in counterpart Japanese Application No. 2009-161305.

* cited by examiner

IMAGE PROCESSING APPARATUS AND COMPUTER-READABLE MEDIUM

CROSS-REFERENCE TO RELATED APPLICATION

This application claims priority from Japanese Patent Application No. 2009-161305, filed on Jul. 8, 2009, the entire contents of which are hereby incorporated by reference.

BACKGROUND

1. Technical Field

The present invention relates to an image processing technique, and particularly relates to gradation correction of an image.

2. Related Art

JP-A-2003-116049 discloses an exposure control technique in an imaging device, in which a degree of backlight effect indicating the intensity of backlight effect is detected using a luminance level in a low luminance level region and a luminance level in another region, and control parameters (gains) for correcting gradation are set to raise the luminance level in the low luminance level region in accordance with the degree of backlight effect.

According to JP-A-2003-116049, exposure can be controlled properly even against light, so that good gradation can be ensured in a picked-up image.

In JP-A-2003-116049, however, control parameters (gains) having one and the same value are unconditionally applied to a plurality of regions having one and the same luminance level in an image regardless of the state of a subject in each region. Therefore, there occurs a problem that the contrast in a local region where the brightness varies drastically may be degraded in an image subjected to gradation correction.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to keep the contrast in a local region, where the brightness varies drastically, in correcting gradation in an image such as a picked-up image or the like.

According to one or more illustrative aspects of the present invention, there is provided an image processing apparatus. The image processing apparatus includes: a brightness information acquisition unit configured to acquire brightness information indicating brightness of each pixel in a target image, wherein high-frequency components are eliminated from the target image; a correction magnification setting unit configured to set, for each pixel of the target image, a correction magnification based on the brightness information, wherein the correction magnification is substantially inversely proportional to the brightness of the pixel; and a gradation correction unit configured to correct the brightness of each pixel based on the correction magnification.

According to one or more illustrative aspects of the present invention, there is provided a computer-readable medium storing a program for causing the computer to perform operations including: (a) acquiring brightness information indicating brightness of each pixel in a target image, wherein high-frequency components are eliminated from the target image; (b) setting, for each pixel of the target image, a correction magnification based on the brightness information, wherein the correction magnification is substantially inversely proportional to the brightness of the pixel; and (c) correcting the brightness of each pixel based on the correction magnification.

DETAILED DESCRIPTION OF EXEMPLARY EMBODIMENTS

Figure 1:
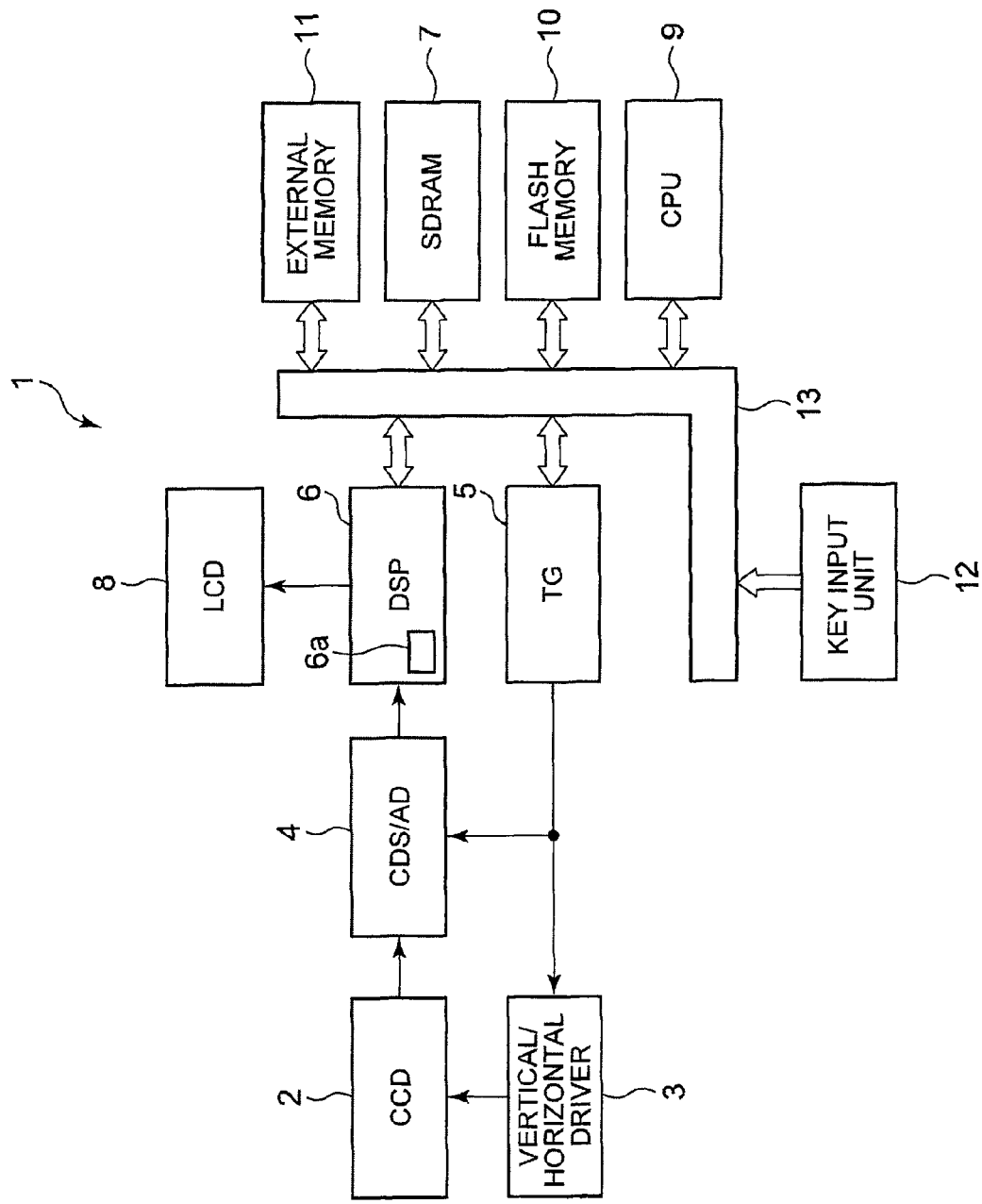
FIG. 1 is a block diagram showing an example of a hardware configuration of a digital still camera according to the invention.

Exemplary embodiments of the present invention will be now described below with reference to the drawings. FIG. 1 is a block diagram showing the outline of the hardware configuration of a digital still camera (hereinafter referred to as "digital camera" simply) illustrated as an exemplary embodiment of the invention.

As shown in FIG. 1, the digital camera 1 has a CCD (Charge Coupled Device) 2 for imaging a subject. The CCD 2 has a structure in which a color filter having a specific color array such as a Bayer array is provided in a photosensitive surface where an optical image of the subject should be formed by a not-shown optical system. The CCD 2 is driven by horizontal and vertical transfer drive signals received from a horizontal/vertical driver 3, so as to convert the optical image of the subject into an electric signal. The converted electric signal is supplied as an imaging signal to a CDS/AD circuit 4, including a CDS (correlated Double Sampling) circuit and an A/D converter (Analog-to-Digital converter).

The horizontal/vertical driver 3 operates based on a timing signal generated by a TG (Timing Generator) 5, so as to generate the horizontal and vertical transfer drive signals, thereby driving the CCD 2. The timing signal generated by the TG 5 is also provided to the CDS/AD circuit 4. The CDS/AD circuit 4 operates based on the timing signal received from the TG 5, so as to remove noise contained in the imaging signal outputted by the CCD 2, and convert the noise-removed imaging signal into a digital signal. The converted digital signal is provided to a DSP (Digital Signal Processor) 6.

The DSP 6 is provided with a buffer memory 6a for processing the digital signal received from the CDS/AD circuit 4, that is, image data composed of data of each pixel having only single color information. The DSP 6 performs processing as follows. That is, for the image data received from the CDS/AD circuit 4, the DSP 6 interpolates missing color information in each pixel based on pixels around the pixel. Thus, the DSP 6 performs de-mosaic processing to generate image data with color component information of R (Red), G (Green) and B (Blue) for each pixel, that is, RGB data.

In addition, the DSP 6 performs digital signal processings such as gradation correction on the RGB data generated by the de-mosaic processing, processing for adjusting white balance, gamma correction processing, various filter processings on the RGB data subjected to the gradation correction, YUV conversion processing for converting the RGB data into YUV data which are image data expressed by a luminance component (Y) and two color difference components (Cb and Cr) for each pixel, etc. The details of the gradation correction will be described later.

In addition, the DSP 6 supplies the YUV data subjected to the digital signal processings, sequentially to an SDRAM (Synchronous Dynamic Random-Access Memory) 7. The SDRAM 7 temporarily stores the YUV data received from the DSP 6.

Further, whenever one frame of YUV data (image data) is accumulated in the SDRAM 7 in a recording mode set as the operating mode of the digital camera 1, the DSP 6 will read the image data accumulated in the SDRAM 7 and supply the read image data to an LCD (Liquid Crystal Display) 8.

The LCD8 has a not-shown liquid crystal display, a drive circuit for driving the liquid crystal display, etc. An image based on image data received from the DSP 6 is displayed as a live view image on a screen of the liquid crystal display.

On the other hand, the TG5 and the DSP 6 are connected to a CPU (Central Processing Unit) 9 through a bus 13. The operations of the TG 5 and the DSP 6 are controlled by the CPU 9.

The CPU 9 operates in accordance with a program stored in a flash memory 10 serving as an EEPROM (Electric Erasable Programmable Read Only Memory) whose memory contents can be rewritten, so as to control the operation of the digital camera 1 as a whole.

In addition, when an image is picked up in the recording mode set as the operating mode of the digital camera 1, the CPU 9 compresses image data temporarily stored in the SDRAM 7 in a predetermined compression system such as a JPEG (Joint Photographic Expert Group) system, and records the compressed image data as an image file into an external memory 11. The external memory 11 is a memory card which is removably attached to the camera body and connected to the bus 13 through a not-shown card interface.

In addition, when a reproduction mode is set as the operating mode of the digital camera 1, the CPU 9 reads a given image file (compressed image data) from the external memory 11 in accordance with necessity, and expands the read data on the SDRAM 7. Further, the CPU 9 supplies the data (YUV data) expanded on the SDRAM 7 to the LCD 8 through the DSP 6 to display a recorded image on the LCD 8.

A key input unit 12 is connected to the bus 13. The key input unit 12 has various operating keys required for user's operation on the digital camera 1, such as a power key, a shutter key, a mode setting key for setting the recording mode or the reproduction mode, etc. The CPU 9 successively detects the operating state of each operating key in the key input unit 12, and executes various processings along programs in accordance with a user's request decided by the detected operating state.

Figure 2:
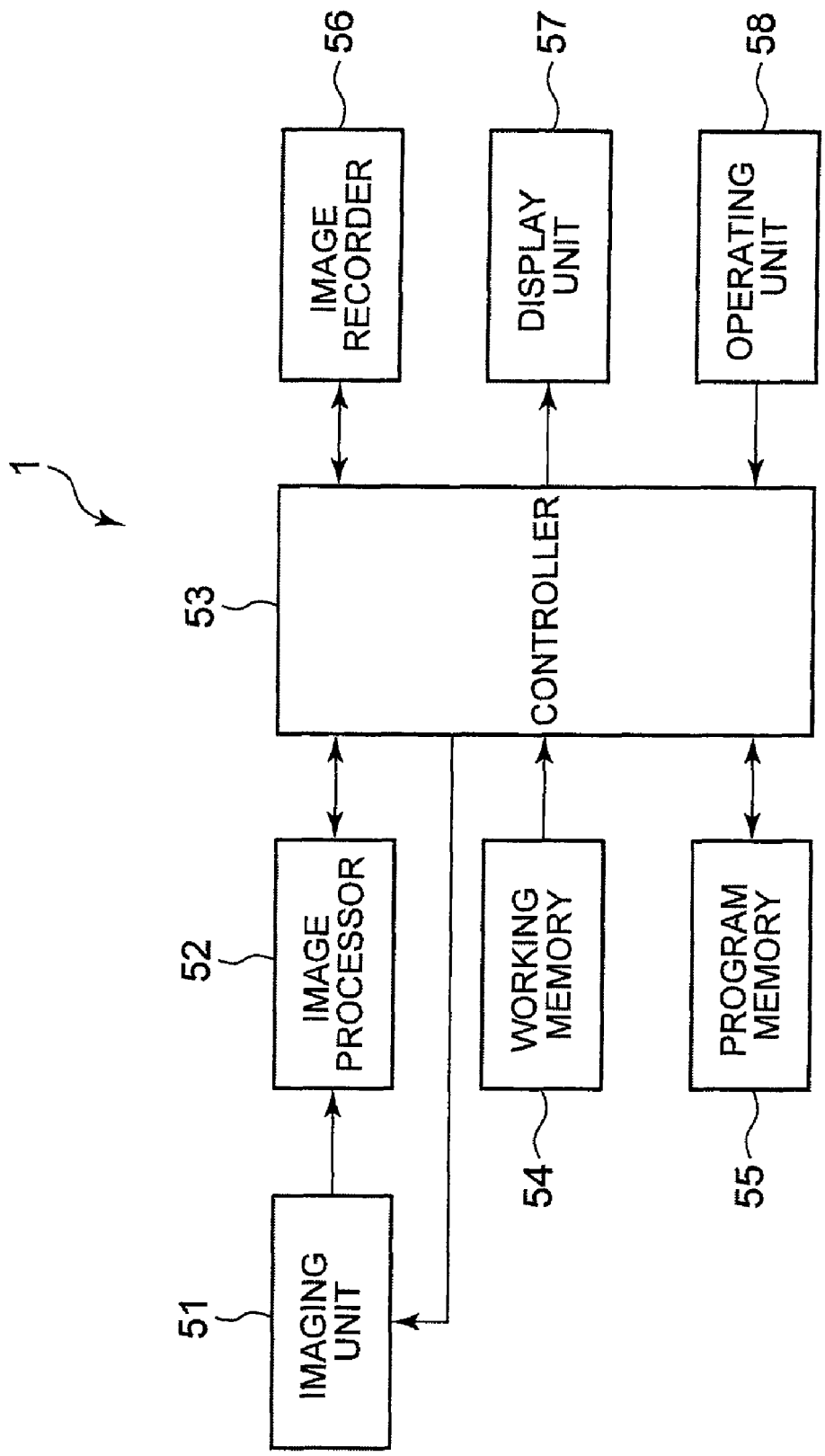
FIG. 2 is a functional block diagram of the digital still camera according to the invention.

FIG. 2 is a functional block diagram showing the configuration of the digital camera 1. As shown in FIG. 2, the digital camera 1 includes: an imaging unit 51; an image processor 52, a controller 53, a working memory 54, a program memory 55, an image recorder 56, a display unit 57 and an operating unit 58.

Each functional block is implemented by one piece or plural pieces of hardware shown in FIG. 1, as described later. That is, the imaging unit 51 is implemented by the CCD 2, the horizontal/vertical driver 3, the CDS/AD circuit 4 and the TG 5 so as to pick up an image of a subject and capture the picked-up image. The image processor 52 is implemented by the DSP 6 so as to perform the image processings on the picked-up image. The controller 53 is implemented by the CPU 9. The working memory 54 and the program memory 55 are implemented by the SDRAM 7 and the flash memory 10 respectively. The image recorder 56, the display unit 57 and the operating unit 58 are implemented by the external memory 11, the LCD 8 and the key input unit 12 respectively.

Figure 3:
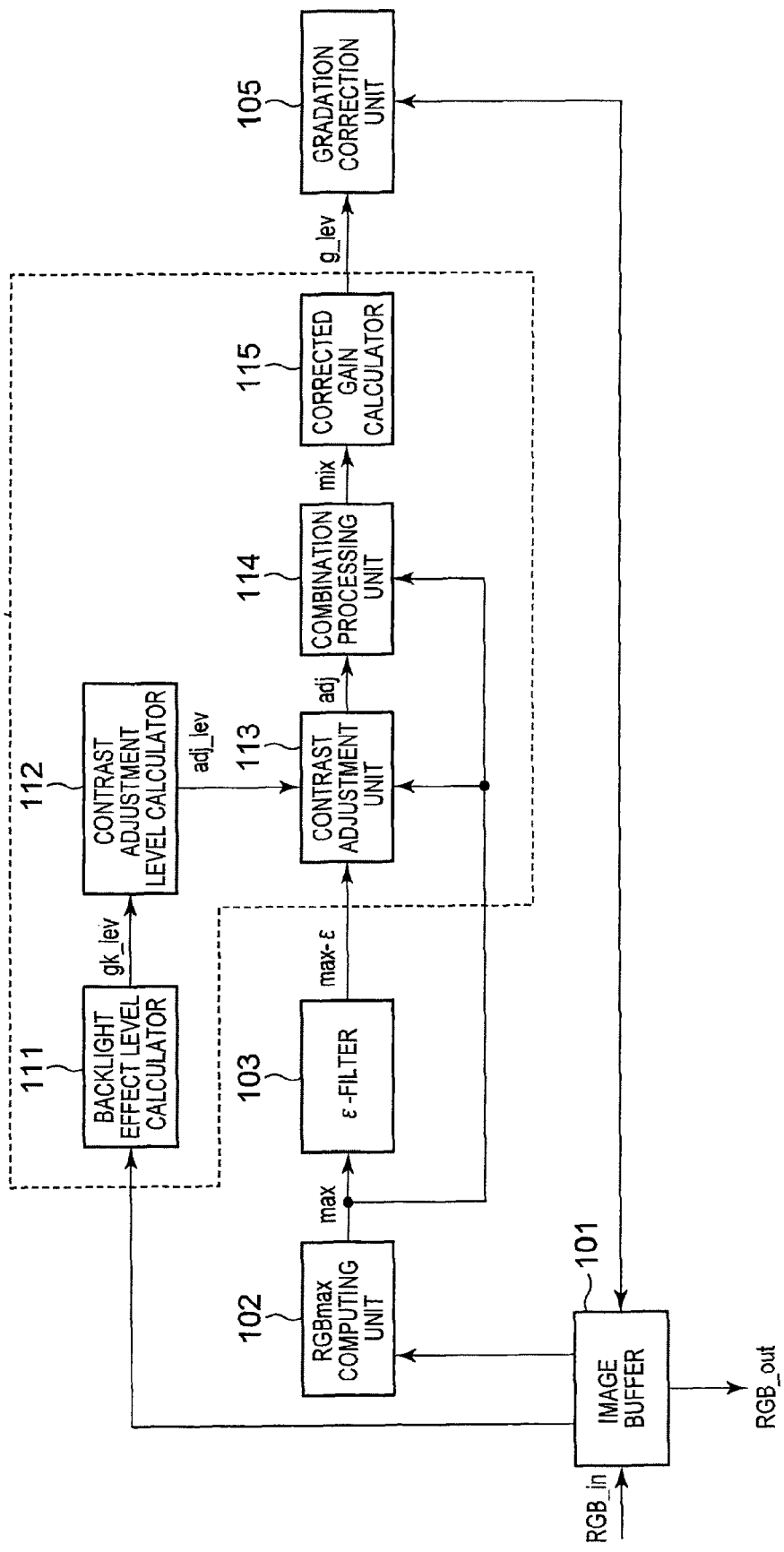
FIG. 3 is a functional block diagram showing a main portion of an image processor.
Figure 4:
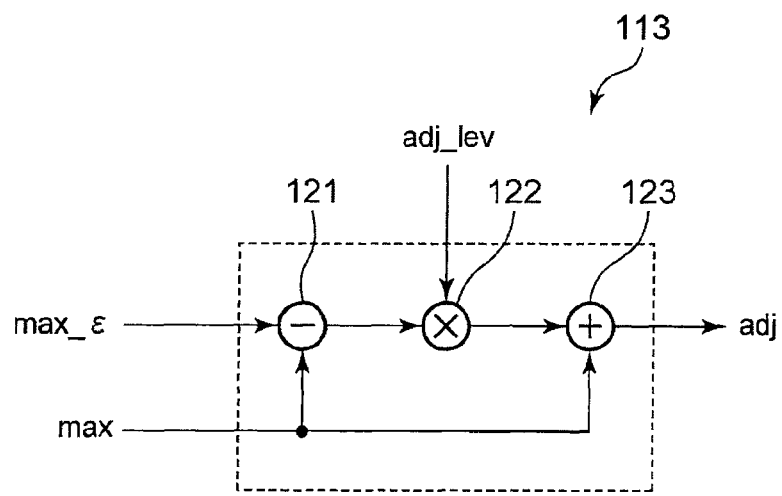
FIG. 4 is a functional block diagram showing a configuration of a contrast adjustment unit.

FIG. 3 is a functional block diagram showing the details of the image processor 52. Respective units of the image processor 52 correct gradation on RGB data generated by the de-mosaic processing. As shown in FIG. 3, the image processor 52 includes: an image buffer 101; an RGB max computing unit 102; an ε-filter 103; a gain setting processor 104; and a gradation correction unit 105. In addition, the gain setting processor 104 includes: a backlight effect level computing unit 111; a contrast adjustment level computing unit 112; a contrast adjustment unit 113; a combination processing unit 114, and a corrected gain calculator 115. Further, the contrast adjustment unit 113 includes a subtracter 121, a multiplier 122 and an adder 123, as shown in FIG. 4.

Each unit of the image processor 52 shown in FIGS. 3 and 4 will be described below. The image buffer 101 is implemented by the aforementioned memory 6a (see FIG. 1). The image buffer 101 stores RGB data (RGB_in) generated by the de-mosaic processing. The RGB data represent an image to be subjected to the gradation correction. In the following description, the image represented by the RGB data will be referred to as "target image". Pixel values of R, G and B color components in the RGB data are in the range "0 to 255".

The RGB max computing unit 102 serves as a brightness component extracting unit. The RGB max computing unit 102 reads the RGB data stored in the image buffer 101. For each pixel, the RGB max computing unit 102 selects one of the R, G and B color components which has the highest pixel value, and acquires the pixel value of the selected color component as a brightness component of the target image. Then, the RGB max computing unit 102 provides a first brightness component value (max) to the ε-filter 103, the contrast adjustment unit 113 and the combination processing unit 114. The first brightness component value (max) is a pixel value of a color component whose pixel value is the highest of all the acquired pixel values in each pixel.

The ε-filter 103 is an image filter which mainly serves to eliminate small-amplitude noise (high-frequency component) overlaid on an image with a sharp change of brightness, that is, to smooth the brightness of the image. Particularly, the ε-filter 103 is a smoothing filter capable of holding edges of an original image. The ε-filter 103 serves as a smoothing unit, which performs filtering processing (described later) to convert the first brightness component value (max) of each pixel received from the RGB max computing unit 102 into a second brightness component value (max_ε). Then, the ε-filter 103 provides the converted second brightness component value (max_ε) to the contrast adjustment unit 113 in the gain setting processor 104.

The RGB max computing unit 102 and the ε-filter 103 serve as a brightness information acquisition unit.

Here, the filtering processing in the ε-filter 103 will be now described. In the ε-filter 103, each pixel is set as a pixel of interest and attention is paid to a pixel region of 3 pixels square (that is, a region including 9 pixels with the pixel of interest as a center of the pixel region). That is, attention is paid to the pixel of interest and eight peripheral pixels around the pixel of interest. Pixel values of the peripheral pixels are adjusted so that a differential value between the pixel value (first brightness component value) of the pixel of interest and the pixel value (first brightness component value) of each peripheral pixel can be made not higher than a threshold T (T=20). Further, the original pixel value of the pixel of interest and the adjusted pixel values of the peripheral pixels are multiplied by ⅑ as a predetermined coefficient, and the total sum of the pixel values obtained thus is calculated. The calculated pixel value is set as a new pixel value (second brightness component value) of the pixel of interest.

In the aforementioned filtering processing, the pixel value (first brightness component value) of the pixel of interest is increased or decreased in accordance with the pixel values (first brightness component values) of the peripheral pixels so that the pixel values of pixels adjacent to each other can be averaged in the image. In addition, in the course of the filtering processing, the pixel value of each peripheral pixel is adjusted to make a differential value from the pixel value of the pixel of interest not higher than the threshold T, and the pixel value of the pixel of interest is increased or decreased (averaged) with the adjusted pixel values of the peripheral pixels.

Thus, in the aforementioned filtering processing, it is possible to reduce the influence which the pixel values of the peripheral pixels located on the bright region side of a border portion between a bright region and a dark region in an image (for example, a border portion of a subject such as a person or a building) gives to the pixel value of the pixel of interest located on the dark region side. Similarly, in the aforementioned filtering processing, it is possible to reduce the influence which the pixel values of the peripheral pixels located on the dark region side of a border portion between a bright region and a dark region in an image gives to the pixel value of the pixel of interest located on the bright region side.

Thus, in the filtering processing in the ε-filter 103, brightness in each portion of the original image can be smoothed while the edges in the original image are kept. In the filtering processing, it is possible to suitably change the range of the pixel region of interest, the value of the threshold T, and the coefficient by which the pixel value of each pixel should be multiplied.

Figure 5:
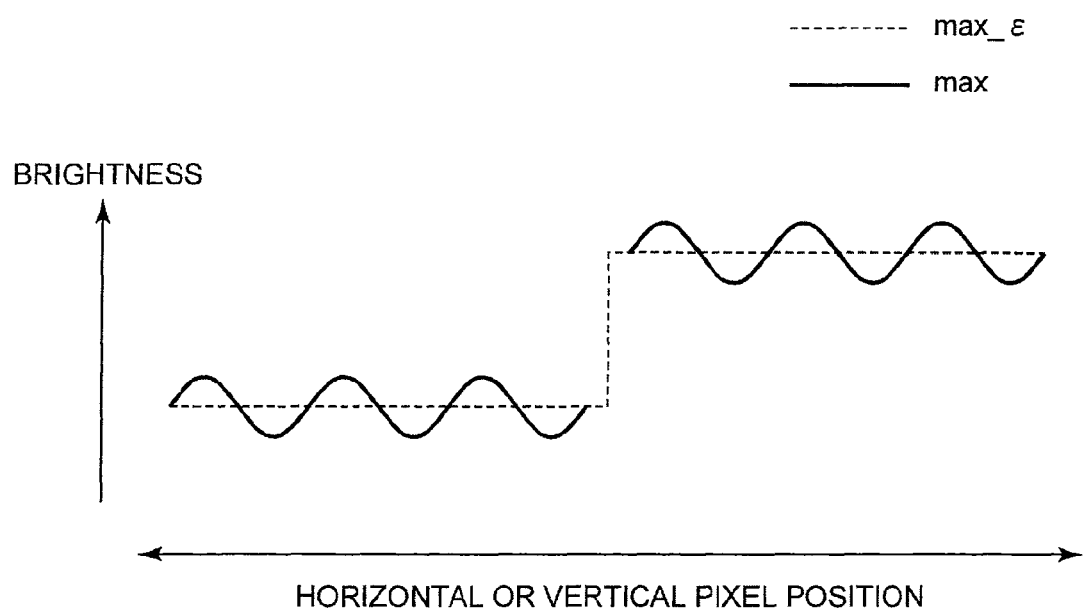
FIG. 5 is a conceptual view showing a function of an $\epsilon$-filter.

FIG. 5 is a conceptual view showing the function of the ε-filter 103. That is, FIG. 5 is a view showing a change in brightness of each pixel with respect to the position of the pixel in a border portion between a bright region and a dark region in an image. In the border portion, brightness varies drastically. In FIG. 5, the abscissa represents a horizontal (or vertical) pixel position, and the ordinate represents brightness of a pixel in each pixel position. The change in brightness depicted by the solid line represents a change in a first brightness component value (max) before the filtering processing. The change in brightness depicted by the broken line represents a change in a second brightness component value (max_ε) after the filtering processing.

Figure 6A:
FIG. 6A shows an example of a brightness information image.
Figure 6B:
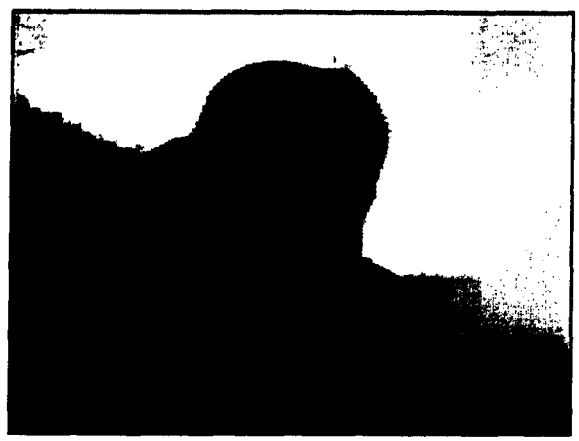
FIG. 6B shows an example of an image subjected to processing with the $\epsilon$-filter.
Figure 6C:
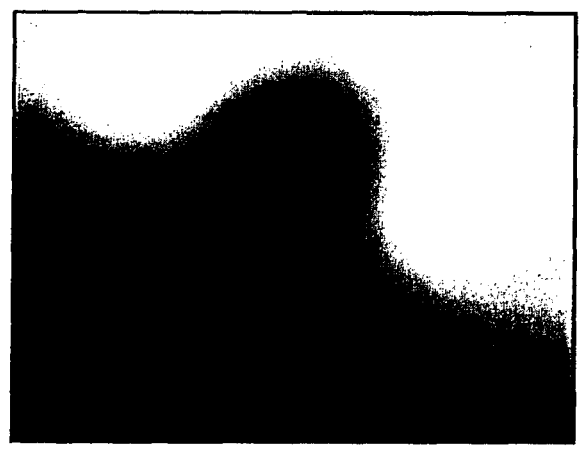
FIG. 6C shows an example of an image subjected to processing with a low pass filter.

FIGS. 6A-6C are views showing specific examples of the effect of the filtering processing by the ε-filter 103. FIG. 6A shows an example of a brightness component image composed of pixels whose pixel values are first brightness component values (max) which have not been subjected to the filtering processing. FIG. 6B shows an example of a global luminance image composed of pixels whose pixel values are second brightness component values (max_ε) which have been subjected to the filtering processing, that is, an image where high-frequency components have been eliminated from the brightness component image. FIG. 6C shows an example of an image obtained when typical filtering processing (smoothing processing) with an LPF (Low Pass Filter) is performed on the brightness component image in FIG. 6A.

As is apparent from FIGS. 6A-6C, in the global luminance image subjected to the filtering processing by the ε-filter 103, low-frequency components included in the brightness component image before the processing have been reflected (or edges have been kept) more accurately than in the image obtained by the typical smoothing processing with the LPF.

The gain setting processor 104 serves as a correction magnification setting unit to individually acquire gains (g_lev) as correction magnifications for correcting gradation for pixels of a target image based on the second brightness component values (max_ε) received from the ε-filter 103, and provide (set) the acquired gains (g_lev) to the gradation correction unit 105. Description will be made below on the details of each aforementioned functional block of the gain setting processor 104 and a specific method for acquiring the gains (g_lev) for correcting gradation.

The backlight effect level computing unit 111 serves as a backlight effect degree acquisition unit to read RGB data stored in the image buffer 101 and acquire a backlight effect level (gk_lev) indicating the degree of backlight effect in a target image based on the read RGB data. The backlight effect level computing unit 111 provides the acquired backlight effect level (gk_lev) to the contrast adjustment level calculator 112. The backlight effect level computing unit 111 acquires the backlight effect level (gk_lev) with the following method.

That is, the backlight effect level computing unit 111 divides a target image into n×m regions, and obtains a luminance level (e.g., an average or a sum of luminance values of pixels in each region) based on RGB data for each region. Next, the backlight effect level computing unit 111 computes a difference between a luminance level of a specific region whose luminance level is the lowest and the average value of luminance levels in the other regions than the specific region, and obtains the computed difference in luminance level (having a value ranging from 0 to 255) as a backlight effect level (gk_lev). Any specific method for obtaining the backlight effect level in a target image is not limited to the aforementioned method.

The contrast adjustment level calculator 112 serves as an adjustment value acquisition unit to acquire a contrast adjustment level (adj_lev) in accordance with the degree of backlight effect of the target image, and provides the contrast adjustment level (adj_lev) to the contrast adjustment unit 113. Specifically, the contrast adjustment level calculator 112 calculates the contrast adjustment level (adj_lev) using a predetermined contrast adjustment level computing function, which uses the backlight effect level (gk_lev) received from the backlight effect level computing unit 111 as a parameter.

Figure 7A:
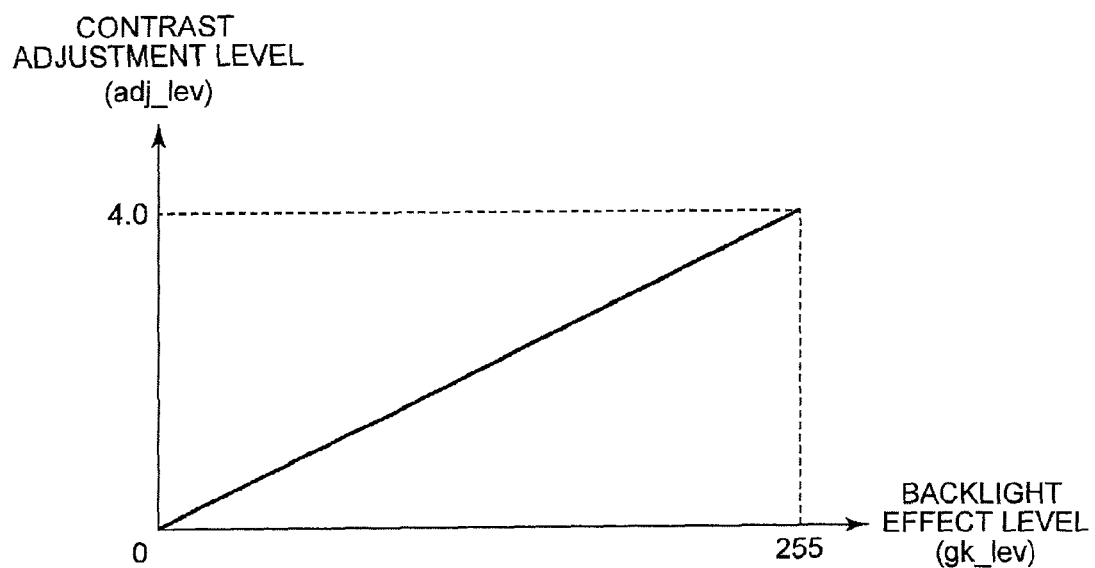
FIGS. 7A and 7B are characteristic graphs showing a change in a contrast adjustment level with respect to a backlight effect level.
Figure 7B:
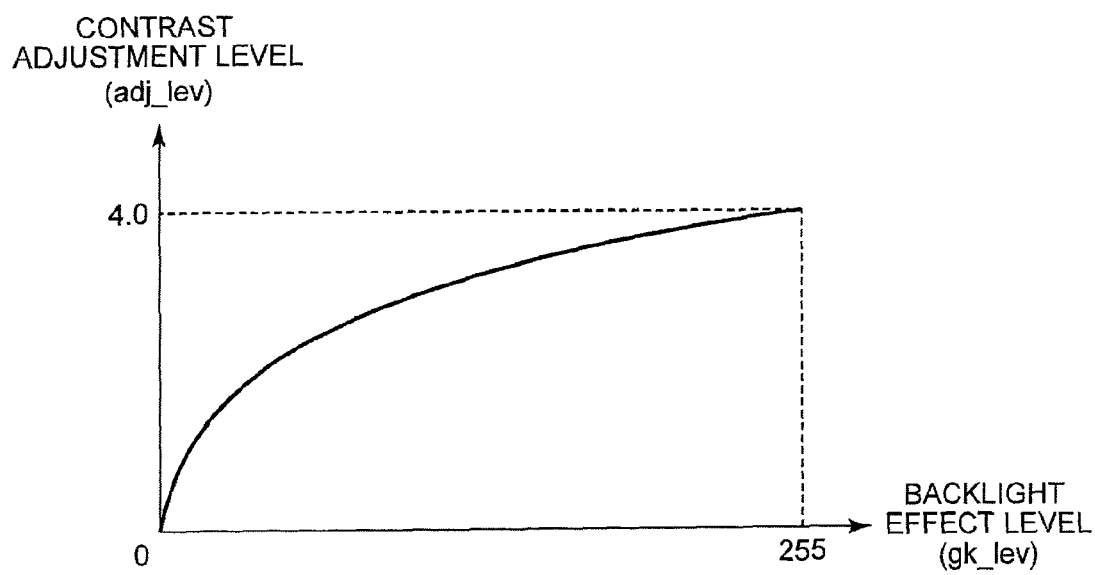

According to the adjustment level computing function used for calculating the contrast adjustment level (adj_lev) by the contrast adjustment level calculator 112, the contrast adjustment level (adj_lev) increases in proportion to the backlight effect level (gk_lev). More specifically, the contrast adjustment level (adj_lev) varies in accordance with the change in the backlight effect level (gk_lev), for example, as shown in FIG. 7A or 7B. In addition, the contrast adjustment level (adj_lev) calculated by the contrast adjustment level calculator 112 is in a range of from 0 to 4.

The contrast adjustment unit 113 serves as a correction unit together with the backlight effect level computing unit 111, the contrast adjustment level calculator 112 and the combination processing unit 114, to correct the second brightness component value (max_ϵ) received from the ϵ-filter 103 in accordance with the degree of backlight effect in the target image. The contrast adjustment unit 113 supplies a corrected third brightness component value (adj) to the combination processing unit 114.

Specifically, the contrast adjustment unit 113 includes: the subtracter 121 serving as a subtractor, the multiplier 122 serving as a multiplier, and the adder 123 serving as an adder (see FIG. 4). In the contrast adjustment unit 131, the subtracter 121 subtracts the first brightness component value (max) from the second brightness component value (max_ϵ) in each pixel, the multiplier 122 multiplies the subtraction result by the contrast adjustment level (adj_lev), and the adder 123 adds the first brightness component value (max) to the multiplication result. Thus, the aforementioned third brightness component value (adj) is generated for each pixel.

Here, the third brightness component value (adj) generated by the contrast adjustment unit 113 is given by the following Expression (1).

$$\text{adj}=\text{adj\_lev}\times(\text{max\_}\epsilon-\text{max})+\text{max} \quad (1)$$

That is, the contrast adjustment unit 113 generates the third brightness component value (adj) by adding a value, which is obtained by multiplying the difference (max_ϵ−max) between the second brightness component value (max_ϵ) and the first brightness component value (max) by adj_lev (0 to 4), to the first brightness component value (max).

In addition, the combination processing unit 114 combines the third brightness component value (adj) of each pixel received from the contrast adjustment unit 113 and the first brightness component value (max) of the pixel received from the RGB max computing unit 102 at a predetermined combination ratio (described later). The combination processing unit 114 provides a combined fourth brightness component value (mix) obtained thus to the corrected gain calculator 115.

Figure 8A:
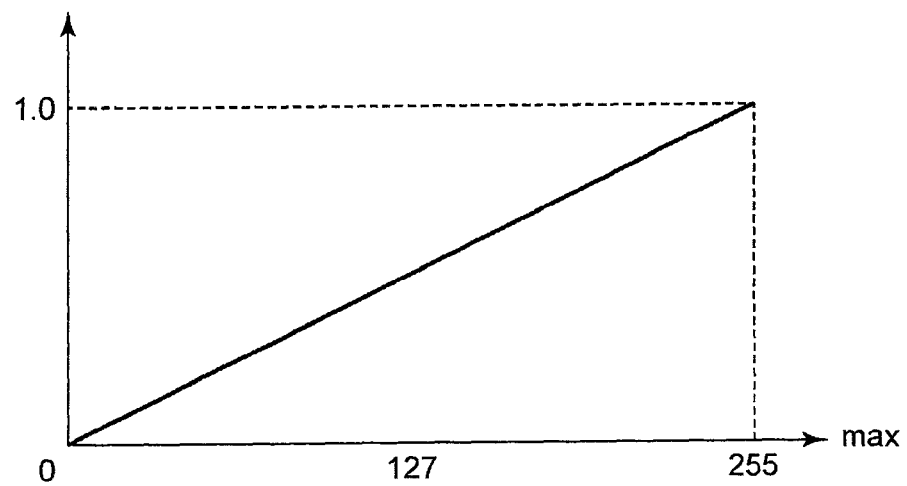
FIGS. 8A and 8B are graphs showing the relationship between a first brightness component value and a combination ratio of the first brightness component value to a third brightness component value.

Specifically, the combination processing unit 114 first serves as a combination ratio determination unit to calculate a combination ratio of the first brightness component value (max) to the third brightness component value (adj) based on a predetermined combination ratio computing function using the first brightness component value (max) of each pixel as a parameter. According to the combination ratio computing function, a combination ratio (α) of the first brightness component value (max) increases in proportion to the first brightness component value (max) as shown in FIG. 8A.

Then, the combination processing unit 114 serves as a combination unit to combine the third brightness component value (adj) and the first brightness component value (max) of each pixel according to the following Expression (2) using the combination ratio (α) calculated based on the combination ratio computing function:

$$\text{Mix}=\alpha\times\text{max}+(1-\alpha)\times\text{adj} \quad (2)$$

and provide the combined fourth brightness component value (mix) to the corrected gain calculator 115.

In addition, the corrected gain calculator 115 computes a gain (g_lev), which should be used for correcting the brightness of each pixel in a target image, for each pixel according to a predetermined gain computing function given by the following predetermined expression and using the fourth brightness component value (mix) of each pixel received from the combination processing unit 114 as a parameter.

$$f\_\text{gain}(\text{mix})$$

The corrected gain calculator 115 then provides the computing result to the gradation correction unit 105.

Figure 9A:
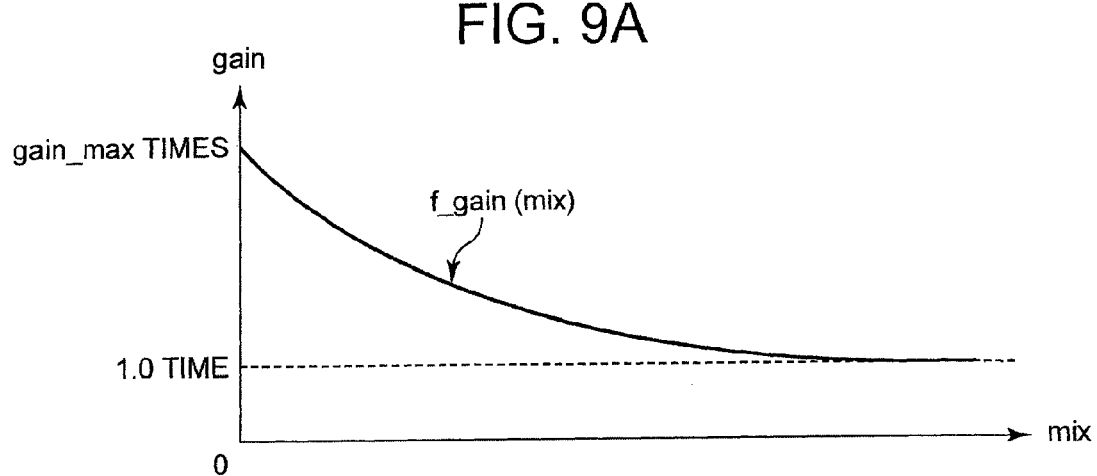
FIGS. 9A-9C are characteristic graphs showing a change in a gain for each pixel with respect to a fourth brightness component value.

The aforementioned gain computing function used for computing the gain (g_lev) of each pixel by the corrected gain calculator 115 is a function having a correction characteristic in which the gain (g_lev) increases with the decrease of the fourth brightness component value (mix) and the gain (g_lev) decreases with the increase of the fourth brightness component value (mix), that is, a correction characteristic in which the gain (g_lev) is in inverse proportion to the fourth brightness component value (mix), as shown in FIG. 9A.

The gradation correction unit 105 reads RGB data stored in the image buffer 101 pixel by pixel, and performs correction thereon by multiplying a pixel value (R value, G value or B value) of a color component in RGB data of each pixel in the read target image by the gain (g_lev) for the pixel received from the gain setting processor 104. In addition, the gradation correction unit 105 rewrites the RGB data of each pixel stored in the image buffer 101 with the corrected RGB data. That is, in the image processor 52, the gradation correction unit 105 serves as a gradation correction unit to correct gradation of a target image by rewriting RGB data (RGB_in) stored in the image buffer 101 with corrected RGB data.

Then, the image processor 52 reads corrected RGB data (RGB_out) stored in the image buffer 101, and performs another digital signal processing such as white balance adjustment processing on the read corrected RGB data, that is, an image subjected to gradation correction, as a target to be processed.

Figure 10:
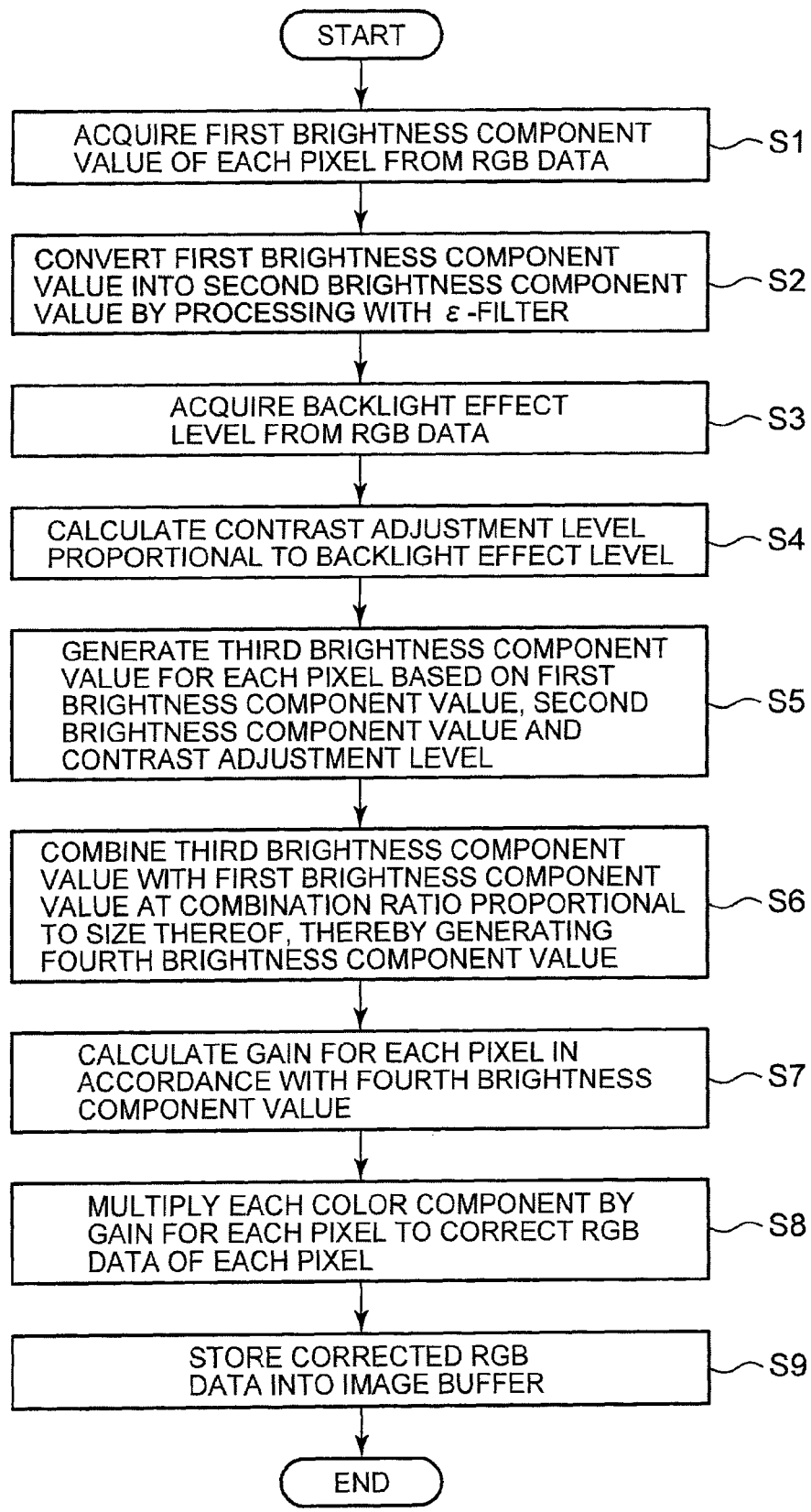
FIG. 10 is a flow chart showing the contents of processing in the image processor.

FIG. 10 is a flow chart showing the contents of gradation correction to be performed by the respective units of the image processor 52 shown in FIG. 3. The details of processing in each step have been already described, and thus the description thereof will be omitted herein.

As shown in FIG. 10, in the gradation correction in the image processor 52, the RGB max computing unit 102 acquires a first brightness component value (max) of each pixel in a target image from RGB data representing the target image (Step S1). Next, the ϵ-filter 103 performs filtering processing to convert the first brightness component value (max) into a second brightness component value (max_ϵ) (Step S2).

In addition, the backlight effect level computing unit 111 acquires a backlight effect level (gk_lev) from the RGB data representing the target image (Step S3). Further, the contrast adjustment level calculator 112 calculates a contrast adjustment level (adj_lev) proportional to the backlight effect level (gk_lev) (Step S4). Next, the contrast adjustment unit 113 generates a third brightness component value (adj) for each pixel based on the first brightness component value (max), the second brightness component value (max_ϵ) and the contrast adjustment level (adj_lev) (Step S5).

Next, the combination processing unit 114 combines the third brightness component value (adj) with the first brightness component value at a combination ratio proportional to the size thereof so as to generate a fourth brightness component value (mix) (Step S6). Next, the corrected gain calculator 115 calculates a gain (g_lev) for each pixel in accordance with the fourth brightness component value (mix) (Step S7). After that, the gradation correction unit 105 multiplies the pixel value of each color component by the gain (g_lev) of each pixel so as to correct the RGB data of the pixel (Step S8). Further, the gradation correction unit 105 rewrites the RGB data (RGB_in) stored in the image buffer 101 with the corrected RGB data of each pixel and stores the corrected RGB data of the pixel into the image buffer 101 (Step S9).

In correcting gradation by the image processor 52 as described above, the fourth brightness component value (mix) of each pixel provided to the corrected gain calculator 115 is brightness information based on the first brightness component value (max) acquired by the RGB max computing unit 102 and the second brightness component value (max_$\epsilon$) acquired by the $\epsilon$-filter 103. That is, the fourth brightness component value (mix) is based not on brightness information of each pixel in the target image but on brightness information of each pixel where high-frequency components have been eliminated from the target image. In addition, the corrected gain calculator 115 sets a gain in inverse proportion to the fourth brightness component value (mix) of each pixel as a gain (g_lev) of the pixel.

Thus, in correcting gradation by the image processor 52, global gradation of the target image can be corrected. In addition, in the image subjected to the gradation correction, similar contrast to that in the target image can be secured even in a local region having a drastic change of brightness in the target image.

The reason why the above effect can be obtained will be described specifically. First, in correcting gradation by the image processor 52, the gain (g_lev) set for each pixel is in inverse proportion to the fourth brightness component value (mix) of the pixel as described above. Thus, the gain (g_lev) for a pixel becomes higher as the pixel belongs to a dark region in a target image, and the gain (g_lev) for a pixel becomes lower as the pixel belongs to a bright region in the target image. Therefore, in an image subjected to the gradation correction, brightness will be largely increased in a region which has been dark in the target image.

Thus, the following effect can be basically obtained in the gradation correction by the image processor 52. That is, it is possible to secure good gradation in a region which has been dark in the target image while suppressing the occurrence of a "whiteout" phenomenon in a region which has been bright in the target image, so that global gradation correction can be performed on the target image. As a result, for example, when the target image is an image where a person is photographed against light and a face portion of the person is dark, an image where the face portion of the person is expressed brightly and colorfully can be obtained by the gradation correction by the image processor 52.

On the other hand, when the brightness of pixels in a dark region in a target image is increased in the gradation correction, the difference in brightness between a pixel on the dark region side and a pixel on the bright region side is reduced in a local region where the brightness has varied drastically in the target image. As a result, the contrast is degraded, for example, in a portion where a dark subject with a comparatively small area has been against a bright region (such as the sky) used as the background in the target image.

Meanwhile, in the gradation correction by the image processor 52, the fourth brightness component value (mix) of each pixel provided to the corrected gain calculator 115 is brightness information generated based on the second brightness component value (max_$\epsilon$). More specifically, the fourth brightness component value (mix) is brightness information where the second brightness component value (max_$\epsilon$) has been corrected through the contrast adjustment unit 113 and the combination processing unit 114. Then, the second brightness component value (max_$\epsilon$) is a pixel value of a pixel of a global luminance image where high-frequency components have been eliminated from a brightness component image composed of pixels whose pixel values are first brightness component values (max) as described above that is, a global luminance image composed of only low-frequency components.

Thus, a gain (g_lev) of each pixel calculated by the corrected gain calculator 115 in the gradation correction, that is, a gain set for each pixel of a target image is characterized as follows, as compared with the case where the first brightness component value (max) is provided to the corrected gain calculator 115. For the sake of convenience of explanation, the details of a gain set for each pixel of a target image will be described with comparison between the case where the first brightness component value (max) is provided to the corrected gain calculator 115 and the aforementioned case where the second brightness component value (max_$\epsilon$) which has not been corrected is provided to the corrected gain calculator 115.

Figure 11A:
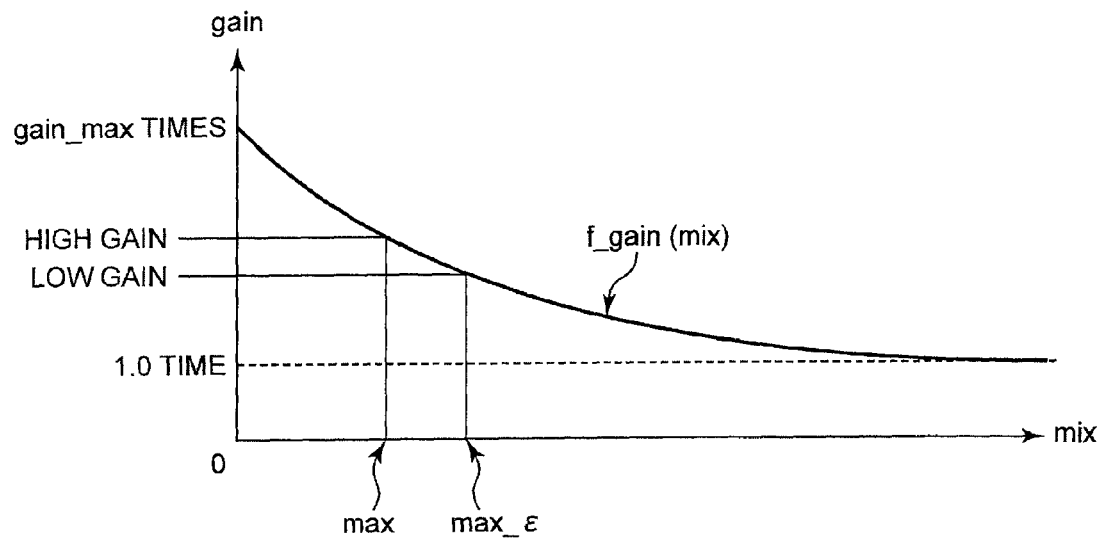
FIGS. 11A and 11B are explanatory views of a gain set for each pixel in a target image.
Figure 11B:
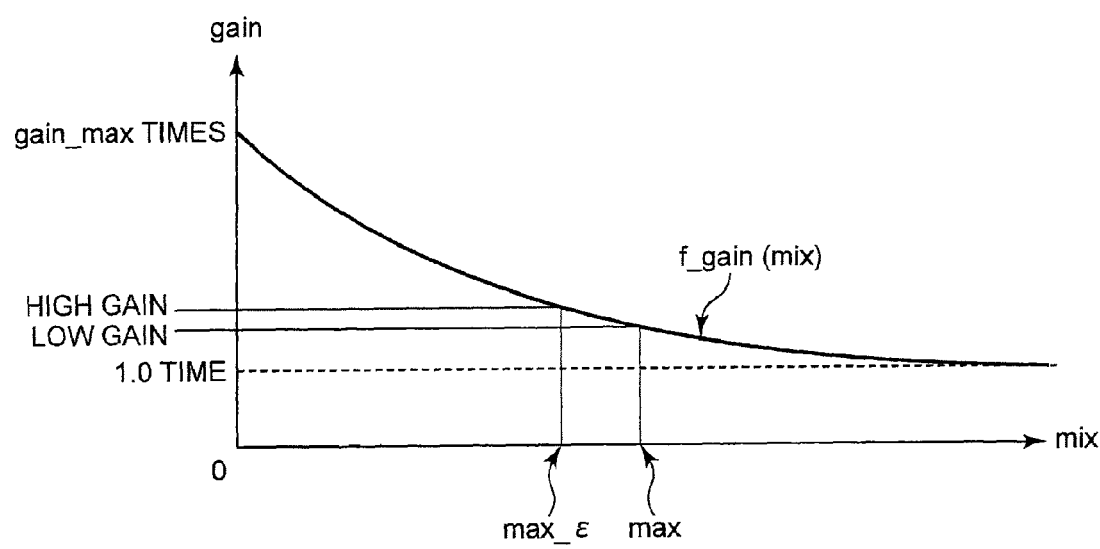

FIGS. 11A and 11B are graphs showing a difference in gain set for each pixel in a target image between the case where the first brightness component value (max) is provided to the corrected gain calculator 115 and the case where the second brightness component value (max_$\epsilon$) which has not been corrected is provided to the corrected gain calculator 115.

That is, FIG. 11A is a graph showing an example of a gain set for a darker pixel than its peripheral pixels in a target image. In a darker pixel than its peripheral pixels, the second brightness component value (max_$\epsilon$) of the darker pixel than the peripheral pixels becomes larger than its original first brightness component value (max) because the original first brightness component value (max) is smoothed with the first brightness component values (max) of the peripheral pixels. Therefore, the gain obtained when the second brightness component value (max_$\epsilon$) is provided to the corrected gain calculator 115 becomes lower than the gain obtained when the first brightness component value (max) is provided to the corrected gain calculator 115. Thus, the increase of brightness caused by the gradation correction is suppressed in the darker pixel than the peripheral pixels. As a result, in a local region where the brightness has varied drastically in the target image, brightness in a dark region is suppressed close to brightness where the gradation correction has not been performed, as compared with any other dark region after the gradation correction.

In addition, FIG. 11B is a graph showing an example of a gain set for a brighter pixel than its peripheral pixels in a target image. In a brighter pixel than its peripheral pixels, the second brightness component value (max_$\epsilon$) of the brighter pixel than the peripheral pixels becomes smaller than its original first brightness component value (max) because the original first brightness component value (max) is smoothed with the first brightness component values (max) of the peripheral pixels. Therefore, the gain obtained when the second brightness component value (max_$\epsilon$) is provided to the corrected gain calculator 115 becomes higher than the gain obtained when the first brightness component value (max) is provided to the corrected gain calculator 115. Thus, the increase of brightness caused by the gradation correction becomes conspicuous in the brighter pixel than the peripheral pixels. As a result, in a local region where the brightness has varied drastically in the target image, brightness in a bright region is emphasized as compared with any other bright region after the gradation correction.

When the brightness of each pixel which is a dark pixel or a bright pixel in a target image is the same as the brightness of peripheral pixels adjacent thereto, the first brightness component value (max) is equal to the second brightness component value (max_ϵ) in each pixel. Thus, there is less possibility that the contrast is degraded in any other region than a local region where the brightness varies drastically.

The details of the gain set for each pixel in the target image in the case where the second brightness component value (max_ϵ) is provided to the corrected gain calculator 115 as described above can be also applied to the configuration where the fourth brightness component value (mix) is provided to the corrected gain calculator 115.

Thus, in the gradation correction by the image processor 52, good contract condition can be obtained in an image subjected to the gradation correction even if the brightness is increased in pixels of a dark region in a target image by the gradation correction. That is, similar contrast to that before the gradation correction can be secured in the image subjected to the gradation correction in a local region where the brightness has varied drastically in the target image.

Figure 12A:
FIGS. 12A and 12B are views showing the effect of gradation correction in the image processor.
Figure 12B:

FIGS. 12A and 12B are views specifically showing the effect of the aforementioned gradation correction. That is, FIG. 12A is a view partially showing an image subjected to the gradation correction when a target image is represented by the first brightness component values (max) as shown in FIG. 6A. More specifically, FIG. 12A is a view showing an upper right portion of the image subjected to the gradation correction when the image is equally divided into four vertically and horizontally. On the other hand, FIG. 12B is a view showing a comparative example. FIG. 12B partially shows an image in which related-art gradation correction to increase the luminance level of a low luminance level region simply has been performed on the target image, corresponding to FIG. 12A.

As shown in FIG. 12B, when the luminance level of the low luminance level region is increased simply according to the related-art gradation correction, the contrast will deteriorate in a region where thin and dark branches and leaves are complicated against the bright sky as illustrated in FIG. 12B, that is, a local region where the brightness varies drastically. On the other hand, according to the gradation correction by the image processor 52, as shown in FIG. 12A, due to the aforementioned reason, the contrast is prevented from deteriorating even in a region where thin and dark branches and leaves are complicated against the bright sky, so that the contrast similar to that of the target image can be secured.

As described above, according to the gradation correction by the image processor 52, global gradation of the target image which has not been subjected to the gradation correction is corrected, while the similar contrast to that of the target image can be secured in an image which has been subjected to the gradation correction, even in a local region where the brightness has varied drastically in the target image which has not been subjected to the gradation correction.

In addition, according to the gradation correction by the image processor 52, RGB data generated by de-mosaic processing is used as image data to be processed, and a pixel value (R value, G value or B value) of each color component in each pixel is corrected individually in accordance with a correction gain (g_lev) set for the pixel, so as to correct the brightness of the pixel. Thus, the following effect can be obtained.

That is, when the pixel value (R value, G value or B value) of each color component is multiplied by the gain (g_lev) set for each pixel in the target image to increase the pixel value of the color component, the color saturation of the image subjected to the gradation correction is increased. This is because color saturation (S) of each pixel is proportional to the difference between a value (MAX) of a color component whose pixel value is the highest of the pixel values (R value, G value and B value) of the color components and a value (MIN) of a color component whose pixel value is the lowest thereof (S=(MAX−MIN)/MAX).

On the other hand, assuming that YUV data after YUV conversion processing is used as image data to be processed in the gradation correction and a luminance component value (Y value) of each pixel is multiplied by a correction gain to increase the luminance, the color saturation of the image which has been subjected to the gradation correction is not increased. This is because the increase/decrease of the luminance component value (Y value) gives no influence to the increase/decrease of the color saturation.

As described above, according to the gradation correction by the image processor 52, high color saturation can be secured in an image which has been subjected to the gradation correction, so that a plurality of colors can be distinguished easily on the image which has been subjected to the gradation correction. Thus, the image which has been subjected to the gradation correction can be made vivid. In addition, original colors can be reproduced accurately in the image which has been subjected to the gradation correction, even in a dark pixel for which a high gain (g_lev) is set in the gradation correction, that is, a pixel whose brightness correction intensity is high.

On the other hand, the image processor 52 acquires the second brightness component value (max_ϵ) as a source of the fourth brightness component value (mix) which is a factor of the gain (g_lev) set for each pixel in the target image, that is, brightness information of each pixel in which high-frequency components have been eliminated from the target image (hereinafter referred to as "low-frequency component information") in the following manner. That is, as described above, the image processor 52 once acquires first brightness component values (max) from RGB data representing the target image, and performs smoothing processing with the ϵ-filter 103 on a brightness component image using the acquired first brightness component values (max) as pixel values, so as to acquire second brightness component values (max_ϵ).

Thus, the image processor 52 can acquire the low-frequency component information of the target image efficiently. That is, the low-frequency component information of the target image can be also obtained such that smoothing processing is performed on RGB data by the ϵ-filter 103 and brightness component values of respective pixels are extracted from the processed RGB data. However, the volume of data to be processed in smoothing processing is large when the smoothing processing is performed on RGB data by the ϵ-filter 103. In comparison with this, the volume of data to be processed in smoothing processing is much smaller when first brightness component values (max) are obtained from RGB data and smoothing processing is performed on the obtained first brightness component values (max) by the ϵ-filter 103. Therefore, the image processor 52 can acquire the low-frequency component information of the target image efficiently.

In addition, in the image processor 52, the ϵ-filter 103 is a smoothing filter having edge holding performance. Thus, in an image subjected to the gradation correction, similar contrast to that of the target image can be reproduced accurately even in a border portion between a bright region and a dark region with a large difference in brightness between the bright region and the dark region correspondingly to the outline of a subject such as a person or a building occupying a comparatively large area in the target image. The reason why such an effect can be obtained will be described below. Here, the effect obtained using the ϵ-filter 103 in the image processor 52 will be described in comparison with the case where a typical low pass filter having no edge holding performance is used in the image processor 52.

Firstly, when a typical low pass filter is used in the image processor 52, the degree of blurring appearing in the border portion between a bright region and a dark region becomes larger in a global luminance image subjected to the filtering processing (smoothing processing) than when the ϵ-filter 103 is used, as shown in FIG. 6C. That is, the global luminance image is obtained as an image in which brightness near the border on the bright region side in the border portion between the bright region and dark region before the filtering processing is darker (with a smaller pixel value) than brightness in the bright region distant from the border between the bright region and the dark region, and brightness near the border on the dark region side in the border portion between the bright region and dark region before the filtering processing is brighter (with a large pixel value) than brightness in the dark region distant from the border between the bright region and the dark region.

On the other hand, in the gradation correction by the image processor 52, as described above, the gain (g_lev) set for each pixel is in inverse proportion to the fourth brightness component value (mix) of the pixel provided to the corrected gain calculator 115. Therefore, when a typical low pass filter is used in the image processor 52, a gain is set for each pixel forming the border portion between the bright region and the dark region in the target image as follows. That is, on the bright region side in the border portion between the bright region and the dark region, the gain set for each pixel forming the vicinity of the border between the bright region and the dark region is larger than that for each pixel in a region distant from the border between the bright region and the dark region. In addition, on the dark region side in the border portion between the bright region and the dark region, the gain set for each pixel forming the vicinity of the border between the bright region and the dark region is smaller than that for each pixel in a region distant from the border between the bright region and the dark region.

Accordingly, when there is a poor change in brightness of each pixel in a bright region side region or a dark region side region forming the border portion between the bright region and the dark region and corresponding to the outline of a subject in the target image, the brightness in the border portion between the bright region and the dark region after the gradation correction will be described below. That is, there occurs a large difference between brightness of each pixel in a region which is located in the border portion between the bright region and the dark region and close to the border between the bright region and the dark region and brightness of each pixel in a region which is distant from the border between the bright region and the dark region, in spite of a small variation in brightness therebetween in the target image. In addition, the larger the difference in brightness between the bright region side and the dark region side in the border portion is, the more conspicuous such a difference in brightness is.

For the above reason, when a typical low pass filter is used in the image processor 52, similar contrast to that of the target image cannot be secured accurately, in an image subjected to the gradation correction, in the border portion between the bright region and the dark region which has a large difference in brightness and corresponds to the outline of a subject such as a person or a building occupying a comparatively large area in the target image.

On the other hand, in the configuration where the ϵ-filter 103 is used in the image processor 52 as in this exemplary embodiment, the degree of blurring appearing in the border portion between the bright region and the dark region can be made lower in a global luminance image subjected to the filtering processing (smoothing processing) than when a typical low pass filter is used, as shown in FIG. 6B. That is, an image which is kept bright (with a large pixel value) near the border on the bright region side in the border portion between the bright region and the dark region which has not been subjected to the filtering processing and dark (with a small pixel value) near the border on the dark region side can be obtained as a global luminance image.

Thus, in using the ϵ-filter 103 in the image processor 52, a gain is set for each pixel forming the border portion between the bright region and the dark region in the target image when the gradation correction is performed by the image processor 52. That is, a gain set for each pixel forming the vicinity of the border on the bright region side in the border portion between the bright region and the dark region is substantially similarly set for each pixel in a region distant from the border. In addition, a gain set for each pixel forming the vicinity of the border on the dark region side in the border portion between the bright region and the dark region is substantially similarly set for each pixel in a region distant from the border.

Accordingly, even when there is a poor change in brightness of each pixel in a bright region side region or a dark region side region forming the border portion between the bright region and the dark region and corresponding to the outline of a subject in the target image, similar brightness can be kept between each pixel in a region close to the border between the bright region and the dark region and each pixel in a region distant from the border between the bright region and the dark region regardless of the bright region side or the dark region side where there has been a poor variation in brightness in an image subjected to the gradation correction.

For the above reason, when the ϵ-filter 103 is used in the image processor 52, similar contrast to that of the target image can be reproduced accurately, in an image subjected to the gradation correction, even in the border portion between the bright region and the dark region which has a large difference in brightness and corresponds to the outline of a subject such as a person or a building occupying a comparatively large area in the target image.

In addition, according to the gradation correction in the image processor 52, the following effect can be obtained in addition to the above effect. That is, in the gradation correction, the second brightness component value (max_ϵ) generated in the ϵ-filter 103 is corrected for each pixel in accordance with the first brightness component value (max) in the contrast adjustment unit 113. Then, the gain (g_lev) of each pixel in the target image is determined based on the corrected third brightness component value (adj). As a result, brightness/darkness balance among pixels in the target image which has not been subjected to the gradation correction can be reflected on global gradation of an image which has been subjected to the gradation correction. Thus, natural gradation condition can be secured in the image which has been subjected to the gradation correction.

Further, according to the gradation correction in the image processor 52, the following effect can be obtained in addition to the above effects. That is, in the gradation correction, the fourth brightness component value (mix) of each pixel provided to the corrected gain calculator 115 is brightness information in which the first brightness component value (max) is combined with the third brightness component value (adj), which is the corrected brightness information of the second brightness component value (max_ε), at a predetermined combination ratio.

As a result, according to the gradation correction, it is possible to decrease the probability of the phenomenon where the gradation correction leads to "whiteout" condition in pixels which have been brighter than their peripheral pixels in the target image. The reason why such an effect can be obtained will be described below. For the sake of convenience of explanation, description will be made on the assumption that the above contrast adjustment level (adj_lev) with which the contrast adjustment unit 113 should correct the second brightness component value (max_ε) is "1", and the third brightness component value (adj) coincides with the second brightness component value (max_ε).

As described above, the second brightness component value (max_ε) of a pixel which has been brighter than its peripheral pixels in the target image becomes smaller than the first brightness component value (max). Accordingly, if the second brightness component value (max_ε) is provided to the corrected gain calculator 115 as it is, the gain (g_lev) set for the pixel which has been brighter than its peripheral pixels in the target image will have a large value. This is because the corrected gain calculator 115 sets a gain which is in inverse proportion to the second brightness component value (max_ε).

Accordingly, if the second brightness component value (max_ε) is provided to the corrected gain calculator 115 as it is, the "whiteout" phenomenon will occur easily in the pixels which have been brighter than their peripheral pixels in the target image. That is, the probability of the "whiteout" phenomenon appearing in the pixels, which have been brighter than their peripheral pixels in the target image, in the image subjected to the gradation correction will increase inevitably at the cost with which similar contrast to that before the gradation correction is secured in a local region where brightness has varied drastically in the target image.

On the other hand, in the gradation correction, the fourth brightness component value (mix) is provided to the corrected gain calculator 115. The fourth brightness component value (mix) is obtained by the first brightness component value (max) combined with the second brightness component value (max_ε) at a predetermined combination ratio (α). That is, the fourth brightness component value (mix) becomes larger than the second brightness component value (max_ε) correspondingly to the first brightness component value (max) combined therewith at the predetermined combination ratio (α). Accordingly, when the fourth brightness component value (mix) is provided to the corrected gain calculator 115, the gain (g_lev) set for each pixel which has been brighter than its peripheral pixels in the target image takes a smaller value than when the second brightness component value (max_ε) is provided to the corrected gain calculator 115 as it is.

According to the gradation correction, therefore, similar contrast to that before the gradation correction can be secured in a local region where brightness has varied drastically in the target image, while the fourth brightness component value (mix) is provided to the corrected gain calculator 115. Thus, it is possible to decrease the probability of the "whiteout" phenomenon appearing in the pixels, which have been brighter than their peripheral pixels in the target image, in the image subjected to the gradation correction.

In addition, in the gradation correction, the combination processing unit 114 sets the combination ratio, with which the first brightness component value (max) should be combined with the third brightness component value (adj), as a combination ratio (α) which is proportional to the first brightness component value (max). Accordingly, the combination ratio of the first brightness component value (max) to the third brightness component value (adj) can be adjusted to be a proper ratio. As a result, it is possible to surely decrease the probability of the "whiteout" phenomenon appearing in the pixels, which have been brighter than their peripheral pixels in the target image, in the image subjected to the gradation correction.

In addition, according to the gradation correction in the image processor 52, the following effect can be further obtained in addition to the above effects. That is, in the image processor 52, the contrast adjustment unit 113 corrects the second brightness component value (max_ε) to generate the third brightness component value (adj). As described above, the contrast adjustment unit 113 multiplies the difference (max_ε−max) between the second brightness component value (max_ε) and the first brightness component value (max) by adj_lev and adds the obtained value to the first brightness component value (max) to generate the third brightness component value (adj).

The relationship between the third brightness component value (adj) generated by the contrast adjustment unit 113 and the contrast adjustment level (adj_lev) will be described below. First, the relationship between the third brightness component value (adj) and the contrast adjustment level (adj_lev) will be described about a pixel which is brighter, that is, larger in the first brightness component value (max), than its peripheral pixels in a target image. That is, the pixel which is brighter than its peripheral pixels is a pixel where the first brightness component value (max) shown by the solid line in FIG. 5 (described above) is larger than the second brightness component value (max E) shown by the broken line in FIG. 5. Accordingly, in the pixel which is brighter than its peripheral pixels, the difference (max_ε−max) between the second brightness component value (max_ε) and the first brightness component value (max) takes a negative value. Thus, as the value of the contrast adjustment level (adj_lev) increases, the third brightness component value (adj) decreases with reference to the second brightness component value (max_ε).

Next, the relationship between the third brightness component value (adj) and the contrast adjustment level (adj_lev) will be described on a pixel which is darker, that is, smaller in the first brightness component value (max), than its peripheral pixels in a target image. That is, the pixel which is darker than its peripheral pixels is a pixel where the first brightness component value (max) shown by the solid line in FIG. 5 is smaller than the second brightness component value (max_ε) shown by the broken line in FIG. 5. Accordingly, in the pixel which is darker than its peripheral pixels, the difference (max_ε−max) between the second brightness component value (max_ε) and the first brightness component value (max) takes a positive value. Thus, as the value of the contrast adjustment level (adj_lev) increases, the third brightness component value (adj) increases with reference to the second brightness component value (max_ε).

On the other hand, in the image processor 52, the corrected gain calculator 115 sets a gain inversely proportional to the fourth brightness component value (mix) of each pixel as a gain (g_lev) of the pixel. According to the gradation correction in the image processor 52, if the contrast adjustment level (adj_lev) is increased, each pixel that has been brighter than its peripheral pixels in the target image will be brighter after the gradation correction, and each pixel that has been darker than its peripheral pixels will be darker after the gradation correction.

Accordingly, in the gradation correction in the image processor 52, with increase of the contrast adjustment level (adj_lev), the contrast increases in an image subjected to the gradation correction. That is, in the image processor 52, the contrast in the image subjected to the gradation correction can be adjusted by adjustment of the contrast adjustment level (adj_lev).

Further, in the image processor 52, the contrast adjustment level (adj_lev) calculated by the contrast adjustment level calculator 112 takes a value increasing in proportion to the backlight effect level (gk_lev). That is, as the degree of backlight effect increases in the target image, the contrast adjustment level (adj_lev) becomes larger. Accordingly, in the gradation correction by the image processor 52, the contrast in the image subjected to the gradation correction can be increased as the degree of backlight effect increases in the target image. As a result, when the target image is an image picked up against light, more proper contrast can be secured all over the image subjected to the gradation correction.

Next, description will be made on modifications of the exemplary embodiment of the present invention. First of all, in the gradation correction by the image processor 52, assume that image data to be processed is RGB data generated by de-mosaic processing. However, even if the image data to be processed by the gradation correction is YUV data subjected to YUV conversion processing, similar contrast to that of the target image can be secured, in an image subjected to the gradation correction, in a local region where brightness has varied drastically in the target image which has not been subjected to the gradation correction. When the image data to be processed by the gradation correction is YUV data subjected to YUV conversion processing, the configuration of the image processor 52 has to be changed into a configuration in which a luminance component (Y) value of each pixel in the target image is provided to the aforementioned ε-filter 103.

In addition, the effects obtained by use of the ε-filter 103 can be also obtained by using another smoothing filter in place of the ε-filter 103 as long as the smoothing filter has edge holding performance. For example, another weighted average filter such as a bilateral filter can be used as such a smoothing filter. If a bilateral filter or the like is used, similar effects to those by use of the ε-filter 103 can be obtained.

In addition, of the effects obtained by the gradation correction by the image processor 52 as described above, the effect that similar contrast to that before the gradation correction can be secured in a local region, where brightness has varied drastically in a target image, in an image subjected to the gradation correction, can be obtained if the image processor 52 has a configuration satisfying the following condition. That is, the effect can be obtained fundamentally if brightness information in which brightness of each pixel has been smoothed is included in brightness information of the pixel to be provided to the corrected gain calculator 115 for calculating the gain (g_lev) of the pixel.

Accordingly, the ε-filter 103 constituting the image processor 52 can be replaced, for example, by a typical low pass filter. That is, the image processor 52 may be configured to use a typical low pass filter to perform smoothing processing on a brightness component image using the first brightness component value (max) as a pixel value of each pixel so as to acquire brightness information of each pixel of a global luminance image composed of low-frequency components of the brightness component image, that is, brightness information corresponding to the second brightness component value (max_ε). Even when the ε-filter 103 is replaced by a typical low pass filter as described above, it is possible to obtain the effect that similar contrast to that before the gradation correction can be secured in a local region, where brightness has varied drastically in a target image, in an image subjected to the gradation correction.

In addition, in the image processor 52, the ε-filter 103 performs filtering processing on the first brightness component values (max) of all the pixels in the target image acquired by the RGB max computing unit 102 so as to generate the second brightness component values (max_ε) of all the pixels. However, it will go well if the second brightness component values (max_ε) can provide brightness information expressing the global brightness condition of the target image. The first brightness component values (max) of all the pixels in the target image do not have to be provided to the ε-filter 103.

Accordingly, the image processor 52 may be, for example, configured as follows. For example, the image processor 52 acquires first brightness component values (max) from the target image which has been once reduced, so as to generate second brightness component values (max_ε) in the reduced image. Then, the image processor 52 newly generates second brightness component values (max_ε) for pixels corresponding to the original image size from the generated second brightness component values (max_ε). If such a configuration is used for the image processor 52, the time required for the filtering processing of the ε-filter 103 can be shortened.

Figure 9B:
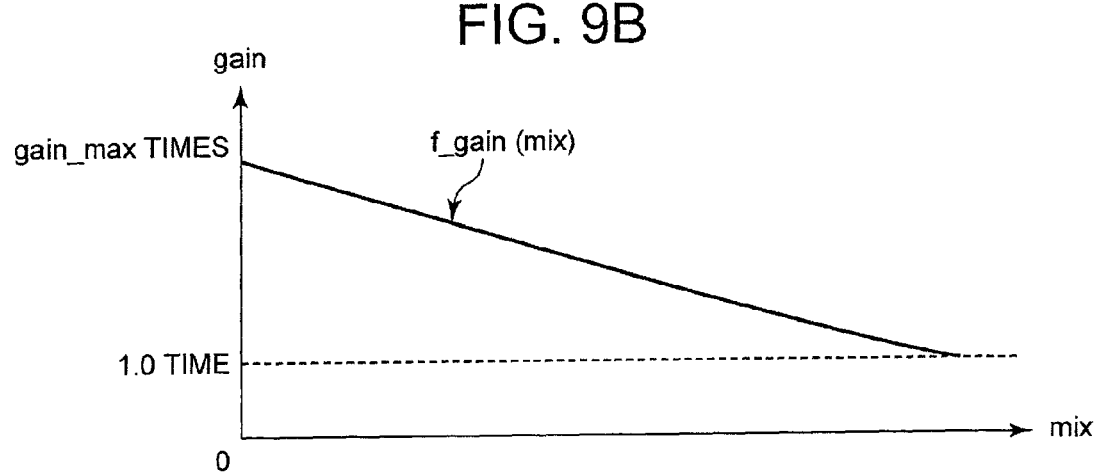
Figure 9C:
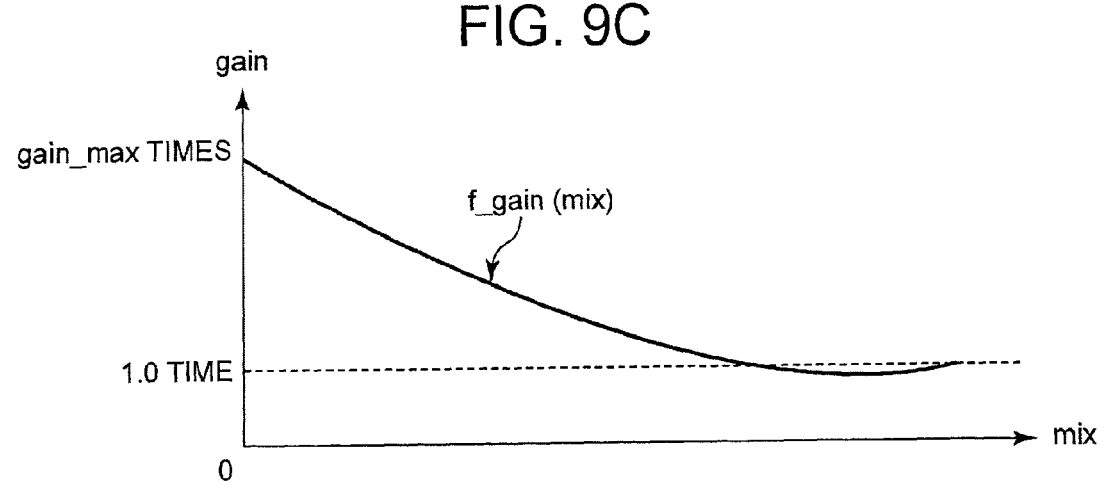

On the other hand, of the effects obtained by the gradation correction by the image processor 52 as described above, the effect that good gradation is secured in a region which has been dark in the target image while the occurrence of a "whiteout" phenomenon is suppressed in a region which has been bright in the target image can be obtained even if the gain (g_lev) of each pixel is not perfectly but schematically inversely proportional to the fourth brightness component value (mix). Accordingly, the aforementioned gain computing function is not limited to the function shown in FIG. 9A, but, for example, a function shown in FIG. 9B or a function shown in FIG. 9C may be used.

In addition, of the effects obtained by the gradation correction by the image processor 52 as described above, the effect that the probability of the "whiteout" phenomenon appearing in the pixels which have been brighter than their peripheral pixels in the target image is decreased can be obtained even if the configuration of the combination processing unit 114 is changed as follows. That is, the configuration of the combination processing unit 114 may be changed so that processing for combining the first brightness component value (max) with the third brightness component value (adj) is performed only on pixels which are brighter than some degree in the target image.

Figure 8B:
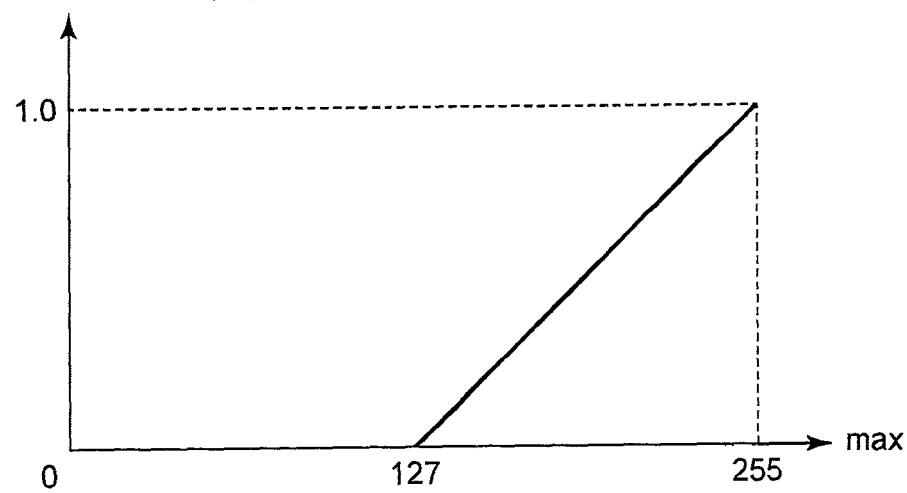

Accordingly, the combination ratio computing function used for calculating the fourth brightness component value (mix) by the combination processing unit 114 may be characterized, for example, as shown in FIG. 8B. That is, the combination ratio computing function used by the combination processing unit 114 may be characterized in that the combination ratio (α) of the first brightness component value (max) to the third brightness component value (adj) increases in proportion to the first brightness component value (max) when the first brightness component value (max) exceeds a predetermined combination threshold ("127" in the illustrated example).

Further, in order to obtain the effect that the probability of the "whiteout" phenomenon appearing in the pixels which have been brighter than their peripheral pixels in the target image can be decreased, the configuration of the combination processing unit 114 may be changed as follows. For example, the configuration of the combination processing unit 114 may be changed to generate the fourth brightness component value (mix) by combining the first brightness component value (max) with the third brightness component value (adj) uniformly at a predetermined combination ratio. Alternatively, for example, the configuration of the combination processing unit 114 may be changed to generate the fourth brightness component value (mix) by combining the first brightness component value (max) with the third brightness component value (adj) at a predetermined combination ratio which changes largely stepwise in accordance with the magnitude of the first brightness component value (max).

In addition, the backlight effect level computing unit 111 of the image processor 52 may compute the backlight effect level (gk_lev) using RGB data of an image obtained by reducing a target image. In addition, any method for computing the backlight effect level (gk_lev) in the backlight effect level computing unit 111 may be used. The backlight effect level computing unit 111 may compute the backlight effect level (gk_lev) in another method than the aforementioned method.

In addition, in the image processor 52, the contrast adjustment unit 113 corrects the second brightness component value (max_$\epsilon$) in accordance with the degree of backlight effect in the target image so as to obtain the third brightness component value (adj) as described above. Thus, the contrast in the image subjected to the gradation correction can be automatically adjusted. However, the contrast in the image subjected to the gradation correction may be changed automatically not always in accordance with the degree of backlight effect in the target image but, for example, in accordance with the distribution condition of brightness in the target image. More specifically, a functional part for acquiring a histogram indicating the distribution condition of brightness in the target image may be provided in the image processor 52 in place of the backlight effect level computing unit 111, while a functional part for determining the contrast adjustment level (adj_lev) in accordance with predetermined setting rules based on the histogram is provided in place of the contrast adjustment level calculator 112.

In addition, in the image processor 52, the contrast adjustment level (adj_lev) can be adjusted to adjust the contrast in the image subjected to the gradation correction. Accordingly, for example, the image processor 52 may have a configuration in which a given contrast adjustment level (adj_lev) decided by the CPU 9 in accordance with a request from a user of the digital camera 1 is provided to the contrast adjustment unit 113 in place of the backlight effect level computing unit 111 and the contrast adjustment level calculator 112.

In addition, in the gradation correction by the image processor 52, the contrast adjustment unit 113 calculates the third brightness component values (adj) of all the pixels by the following Expression (1).

$$adj = adj\_lev \times (max\_\epsilon - max) + max \quad (1)$$

That is, the contrast adjustment unit 113 corrects the second brightness component values (max_$\epsilon$) of all the pixels using the same expression. However, the contrast adjustment unit 113 may be configured to apply different expressions to pixels which are brighter than their peripheral pixels in the target image, that is, pixels expressed by "(max_$\epsilon$-max)>0", and pixels which are darker, that is, pixels expressed by "(max_$\epsilon$-max)<0", respectively, to calculate the third brightness component values (adj).

For example, the contrast adjustment unit 113 may be configured to calculate the third brightness component values (adj) for the brighter pixels using the following Expression (1-a):

$$adj = adj\_lev \times (max\_\epsilon - max) + max \times ks \quad (1-a)$$

and calculate the third brightness component values (adj) for the darker pixels using the following Expression (1-b):

$$adj = adj\_lev \times (max\_\epsilon - max) + max \times kt \quad (1-b)$$

That is, the contrast adjustment unit 113 may be configured to apply the expressions only different in coefficients ks and kt to the brighter pixels and the darker than their peripheral pixels respectively to calculate the third brightness component values (adj). When the third brightness component values (adj) are calculated for the brighter pixels and the darker pixels than their peripheral pixels individually, the contrast in the image subjected to the gradation correction will be often improved if the coefficient ks in the Expression (1-a) is set to be larger than the coefficient kt in the Expression (1-b).

In addition, according to this exemplary embodiment, the gain setting processor 104 is configured to be constituted by the backlight effect level computing unit 111, the contrast adjustment level calculator 112, the contrast adjustment unit 113, the combination processing unit 114 and the corrected gain calculator 115. However, the gain setting processor 104 may be configured in the following manner so that similar contrast to that in the target image can be secured in a local region where brightness varies drastically in the target image when the gradation correction is performed.

For example, the gain setting processor 104 may be configured so that the combination processing unit 114 is removed, and the third brightness component value (adj) is provided to the corrected gain calculator 115 as it is. Alternatively, the gain setting processor 104 may be configured so that the backlight effect level computing unit 111, the contrast adjustment level calculator 112 and the contrast adjustment unit 113 are removed, and the second brightness component value (max_$\epsilon$) is provided to the combination processing unit 114 as it is. Alternatively, the gain setting processor 104 may be configured so that all the units other than the corrected gain calculator 115 are removed, and the second brightness component value (max_$\epsilon$) is provided to the corrected gain calculator 115 as it is.

In addition, the exemplary embodiment of the invention has been described here on the digital camera 1 including the image processing apparatus according to the invention. However, the invention can be also applied to another imaging apparatus than the digital camera 1, for example, an imaging apparatus having a configuration capable of recording moving pictures. The invention can be applied to various imaging apparatuses, for example, including a digital camera provided with a CMOS (Complementary Metal Oxide Semiconductor) type solid-state image sensing device, a digital camera capable of picking up moving pictures as well as still pictures, a digital video camera principally serving to pick up moving pictures, etc., in addition to CCDs.

In addition, the invention is not limited to an imaging apparatus, but can be also applied to an image processing apparatus which performs image processing on images stored as image data in a desired storage medium. An example of the image processing apparatus includes a printer for printing an image based on image data.

According to the invention, the image processor 52 shown in FIG. 2 can be, for example, implemented by an ASIC (Application Specified Integrated Circuit), or a CPU of a desired computer, a memory, a program loaded on the memory etc. Further, a computer storage medium for storing programs for executing the operation described in the aforementioned exemplary embodiment may be used.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An image processing apparatus comprising:
    a brightness information acquisition unit that acquires brightness information indicating a brightness of each pixel in a target image from which high-frequency components are eliminated;
    a correction unit that corrects the brightness of each pixel indicated by the brightness information acquired by the brightness information acquisition unit by combining the brightness of each pixel indicated by the brightness information acquired by the brightness information acquisition unit with the brightness of each pixel of the target image at a given combination ratio which is predetermined in proportion to the brightness of each pixel in the target image;
    a correction magnification setting unit that sets, for each pixel, a correction magnification inversely proportional to the brightness of each pixel combined by the correction unit; and
    a gradation correction unit that corrects the brightness of each pixel by correcting a plurality of color component information of each pixel based on the correction magnification set for each pixel by the correction magnification setting unit.

2. The apparatus according to claim 1, wherein the brightness information acquisition unit comprises:
    a brightness component extraction unit that extracts brightness components from the target image; and
    a smoothing unit that acquires the brightness information indicating the brightness of each pixel in the target image from which the high frequency components are eliminated, by smoothing a brightness component image composed of the brightness components extracted by the brightness component extraction unit.

3. The apparatus according to claim 2, wherein the smoothing unit is a smoothing filter capable of holding edges in the brightness component image.

4. The apparatus according to claim 3, wherein the smoothing filter adjusts a pixel value of each of peripheral pixels around a pixel of interest such that a difference between a pixel value of the pixel of interest and the pixel value of each peripheral pixel is less than or equal to a threshold value, and sets an average value of the pixel value of the pixel of interest and the pixel values of the peripheral pixels as a new pixel value of the pixel of interest.

5. The apparatus according to claim 1, wherein the correction magnification setting unit sets, for each pixel in the target image, the correction magnification inversely proportional to the brightness of each pixel indicated by the brightness information acquired by the brightness information acquiring unit.

6. An image processing apparatus comprising:
    a brightness information acquisition unit that acquires brightness information indicating a brightness of each pixel in a target image from which high-frequency components are eliminated;
    a subtractor that subtracts the brightness of each pixel of the target image from the brightness of each pixel indicated by the brightness information acquired by the brightness information acquiring unit;
    a backlight effect degree acquisition unit that acquires a degree of backlight effect of the target image;
    a multiplier that multiplies the brightness of each pixel subtracted by the subtractor, by a value in proportion to the degree of backlight effect acquired by the backlight effect degree acquisition unit as a contrast adjustment value; and
    an adder that adds the brightness of each pixel of the target image to the brightness of each pixel multiplied by the multiplier;
    a correction magnification setting unit that sets, for each pixel of the target image, a correction magnification that is substantially inversely proportional to the brightness of each pixel added by the adder; and
    a gradation correction unit that corrects the brightness of each pixel by correcting a plurality of color component information of each pixel based on the correction magnification set for each pixel by the correction magnification setting unit.

7. A non-transitory computer-readable recording medium having a program stored thereon that is executable by a computer to cause the computer to perform a process comprising:
    acquiring brightness information indicating a brightness of each pixel in a target image from which high-frequency components are eliminated;
    correcting the brightness of each pixel indicated by the acquired brightness information by combining the brightness of each pixel indicated by the acquired brightness information with the brightness of each pixel of the target image at a given combination ratio which is predetermined in proportion to the brightness of each pixel in the target image;
    setting, for each pixel, a correction magnification inversely proportional to the brightness of each pixel combined by the correcting; and
    correcting the brightness of each pixel by correcting a plurality of color component information of each pixel based on the correction magnification set for each pixel.

8. A non-transitory computer-readable recording medium having a program stored thereon that is executable by a computer to cause the computer to perform a process comprising:
    acquiring brightness information indicating a brightness of each pixel in a target image from which high-frequency components are eliminated;
    subtracting the brightness of each pixel of the target image from the brightness of each pixel indicated by the acquired brightness information;
    acquiring a degree of backlight effect of the target image;
    multiplying the brightness of each pixel subtracted by the subtracting, by a value in proportion to the acquired degree of backlight effect as a contrast adjustment value; and
    adding the brightness of each pixel of the target image to the brightness of each pixel multiplied by the multiplying;
    setting, for each pixel of the target image, a correction magnification that is substantially inversely proportional to the brightness of each pixel added by the adding; and
    correcting the brightness of each pixel by correcting a plurality of color component information of each pixel based on the correction magnification set for each pixel.

* * * * *